Patented Sept. 30, 1947

2,428,252

UNITED STATES PATENT OFFICE 2,428,252

PROCESS OF COMPOUNDING RUBBERY CO-POLYMER OF BUTADIENE AND STYRENE WITH AMORPHOUS SILICA AND PRODUCT THEREOF

Gerald von Stroh, Berkeley, Calif., assignor to The Permanente Metals Corporation, Oakland, Calif., a corporation of Delaware No Drawing. Application April 28, 1944,
Serial No. 533,244

4 Claims. (Cl. 260—41)

1

This invention relates to a process for compounding rubber and a product therefor.

In the preparation of manufactured rubber or of manufactured rubber goods, for example, tires, footwear or mechanical goods such as insulation, gaskets and the like, it is the practice to modify the properties of the starting material, which may be natural rubber or synthetic elastomer, by the incorporation of various ingredients. In the production of rubbers having the most desirable characteristics for certain applications, it has long been the practice to add certain types of inorganic materials, such as carbons, zinc oxides, magnesias and others. Silica or siliceous material falls in the class of inorganic addition agent and would, being cheap and abundant, lessen the cost of rubber compounding if its addition improved the characteristics of the final product. However, the silicas or siliceous materials such as clays and infusorial earth have not shown peculiarly advantageous effects. Clays have been considered reinforcing fillers in the class of the carbon blacks but with the disadvantage that they tend to retard the cures; while the infusorial earths have been considered to be inert fillers or diluents.

It is an object of this invention to provide a silica ingredient for rubber which results in an improved rubber product. It is a further object of this invention to provide a process for compounding rubber which includes the admixture thereto of a silica ingredient which has a beneficial effect upon the characteristics of the final rubber product.

I have found that an improved rubber product is obtained by compounding the starting material with silica which is obtained by the oxidation of silicon in the vapor state. The result of such a reaction is the production of a sublimed silica having a very small particle size and these silica particles are in the form of tiny spheres or globules.

The silica product of my invention can be prepared by reacting vaporized silicon with oxygen or an oxygen-containing gas. However, one very convenient way of obtaining the silica is to recover the silica fume produced in the well-known ferrosilicon process for manufacturing magnesium. In this process, silica fume is produced in the manufacture of the ferrosilicon reducing agent which is employed in the recovery of magnesium from its oxygen compounds. The ferrosilicon may be represented by the symbol FeSi, which is to be understood to indicate an alloy of iron and silicon in any desired proportions. It

2 can be produced by reacting a siliceous material as follows:

$$SiO_2(quartz) + 2C + Fe \rightarrow FeSi + CO$$

In order to obtain an alloy containing 75% of silicon, an excess of quartz is reacted as follows:

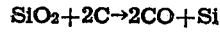
$$SiO_2 + 2C \rightarrow 2CO + Si$$

Part of this excess silicon, which is in the vapor state at the temperatures of the above reactions, combines with oxygen after issuing from the reaction zone, as in an oxygen-containing gas, to give again $SiO_2$. This silica, however, which may be said to be back-reacted, is in an extremely finely divided state and exists as spherical particles. Its physical characteristics are in general strikingly different from those of the original quartz.

Another method of obtaining the silica product desired is to reduce quartz, or other relatively coarse silica material, with carbon and then to re-oxidize the vapors as they leave the reaction zone. In this method the vaporous products of the reduction are rapidly cooled in the presence of oxygen or an oxygen-containing gas, forming solid particles of $SiO_2$ which are deposited in an extremely finely divided condition and which are spherical in shape and amorphous in character.

It may be that the element silicon is vaporized from the reduction zone and then oxidized to silica, or it may be that a lower oxide of silicon such as silicon monoxide is first formed and that this compound is then oxidized to silica. Whatever the mechanism may be, the result of the reaction is the production of anhydrous, amorphous, finely divided silica as described above, the particles being predominantly less than one micron in diameter.

It is an advantage of this silica product for incorporation in the rubber compounding operation that, while it improves certain characteristics of the final product it is also very readily dispersible. This leads to the further advantage in compounding that loadings of any desired amount can be obtained. Furthermore, rubber or elastomer compounded with this silica product is more easily tubed and calendered. The silica ingredient for rubber of my invention has the advantages that it is amorphous in character and of fine particle size so that it disperses quickly and uniformly, and that, furthermore, it effects specific improvements in the final products. This silica is advantageous in compounding synthetic elastomers and, of the latter, it shows peculiar advantages in the compounding of the rubbery butadiene-styrene copolymers. The fume silica may be used directly as recovered from the above processes or it may be conditioned for use in any desired manner, except that the particle size does not require to be altered and it is an advantage of the silica product of my invention that the particle size averages not over 150 millimicrons and is smaller and more uniform than can be obtained by grinding, milling or the like, of larger particles. Furthermore, these particles are spherical in shape and this form is also not obtainable by grinding or the other usual mechanical means of subdivision.

In the compounding of butadiene-styrene copolymer, my silica product is advantageously employed as a reinforcing agent and it can be used to replace other reinforcing agents or in conjunction with such other agents; not only does this silica product exhibit reinforcing qualities but it has the added advantages that it gives lower heat generation and retards cut-growth in the products.

As an example of the process of compounding butadiene-styrene copolymer synthetic rubber according to my invention I admix with 100 parts by weight rubbery butadiene-styrene copolymer, 5 parts by weight of processing oil, 5 parts by weight of zinc oxide, 2 parts by weight of sulfur, 1.5 parts by weight of mercaptobenzothiazole and 50 parts by weight of silica recovered from the process of making ferrosilicon described above. The ingredients are mixed on compounding rolls until dispersion is complete and the elastomer is then sheeted off and cured at 280° F. Samples are taken for testing at the end of 60 minutes, 70 minutes and 80 minutes of cure. Two other batches are made up in exactly the same way except that 75 parts and 100 parts of the above silica are added, respectively. A further batch is made up, also in exactly the same way except that 50 parts of carbon black are added in place of the silica, no silica being added. The batches are all cured and tested in the same way to determine the cut-growth, or behavior in the flexing tests.

In the determination of cut-growth, a cut is made in a strip of the elastomer, the original cut in the tests being one-eighth inch wide and one-sixteenth inch deep, and the strip is placed in a machine and subjected to flexing for any desired time. In these tests the material is tested by the De Mattia flexing machine and the amount by which the original cut is increased, or the cut-growth, is noted at the end of any given flexing period. In tests conducted in this manner on batches described above it is found that the samples which are made up containing carbon black break completely across the face of the strip, which was one inch in width, in 188,702 flexes in the case of the 60 minute cure; in 159,668 flexes for the 70 minute cure; and 131,849 flexes for the 80 minute cure. In contrast to these results, the silica-containing samples show a slight widening of the cut along the line of flex for the corresponding cures and number of flexes but the increase was not great enough to measure. In no case do these silica-containing samples break completely across. This demonstrates quite clearly the greater stability of the silica-containing elastomers under flexing stresses.

Siliceous earths have been used heretofore in an endeavor to decrease "cut-growth" in elastomers but the inclusion of such earths in the compounding has led to increased heat generation under flexing stress and, therefore, to the development of higher temperatures in the stock. In contrasting the compounding of Buna-S with such earths by making up batches in exactly the same manner except that one series contains kaolin and another series contains the silica product of my invention, I find that the silica-containing products show lower heat generation in flexing tests than do the kaolin-containing products. The kaolin-containing samples in one series of tests develop temperature increases of from 252° to 260° while the silica-containing series develop temperature increases ranging from 171° to 231°. This decrease in heat generation during flexing is quite advantageous in many manufactured rubber goods, such as tires, for instance. Lower compression set is obtained in elastomer compounded with the silica fume in this series of tests in comparison with that obtained with the siliceous earth. In variations, loadings as high as desired can be obtained with the silica fume described, for example, up to 200 parts of the silica per 100 parts of the elastomer.

By compounding elastomers according to the process of my invention and with the inclusion of the silica obtained by the vapor phase oxidation of silicon, I obtain elastomer products which exhibit very low cut-growth and lowered heat generation on flexing. Elastomers compounded according to my invention exhibit good elongation and good tear resistance and, in addition, have high dielectric properties which increase their usefulness in insulation applications. Stocks so compounded with the silica fume exhibit also low moisture absorption. They also show considerably greater rebound characteristics than the carbon blacks, for example, with which they have been compared.

The silica product of my invention can be advantageously included in compounding natural or synthetic elastomers and it is particularly advantageous in compounding rubbery butadiene-styrene copolymer. In some instances it is advantageously combined with other reinforcing fillers, such as carbon black, and can be used in combination therewith in various proportions in the compounding of elastomers. By adding a combination of my silica product with carbon black, for instance, a compounded elastomer can be obtained which has a higher tensile, decreased cut-growth and lower heat generation in the stock during use.

It is to be understood that the above examples and description have been given for purposes of illustration only and that variations may be made therein without departing from the spirit and scope of this invention. Other vulcanizing agents than sulfur may be used, for instance, and other accelerators or other additional ingredients than those shown in the examples may be used.

Having now described my invention, what I wish to claim is:

1. Process for compounding butadiene-styrene copolymer synthetic rubber which comprises incorporating in said synthetic rubber, sulfur, and anhydrous, amorphous, finely divided silica obtained by bringing into contact with an oxygen-containing gas the vapors issuing from a zone wherein silica is reduced with carbon and recovering the finely divided silica deposited from said vapors, said silica being added in the ratio of from 50 parts to 200 parts by weight per 100 parts by weight of said synthetic rubber, and curing the composition.

2. Butadiene-styrene co-polymer synthetic rubber having uniformly dispersed therein anhydrous, amorphous, finely divided silica obtained by bringing into contact with an oxygen-containing gas the vapors issuing from a zone wherein silica is reduced with carbon and recovering the finely divided silica deposited from said vapors, said silica being present in the ratio of from 50 parts to 200 parts by weight per 100 parts by weight of said synthetic rubber.

3. Process for compounding butadiene-styrene co-polymer synthetic rubber which comprises incorporating in said synthetic rubber, sulfur, and anhydrous, amorphous, finely divided silica obtained by bringing into contact with an oxygen-containing gas the vapors issuing from a reaction zone wherein ferrosilicon is produced by reducing silica with carbon in the presence of iron, and recovering the finely divided silica deposited from said vapors, said silica being added in the ratio of from 50 parts to 200 parts by weight per 100 parts by weight of said synthetic rubber, and curing the composition.

4. Butadiene-styrene co-polymer synthetic rubber having uniformly dispersed therein an anhydrous, amorphous, finely divided silica obtained by bringing into contact with an oxygen-containing gas the vapors issuing from a reaction zone wherein ferrosilicon is produced by reducing silica with carbon in the presence of iron, and recovering the finely divided silica deposited from said vapors, said silica being present in the ratio of from 50 parts to 200 parts by weight per 100 parts by weight of said synthetic rubber.

GERALD von STROH.

REFERENCES CITED

The following references are of record in the file of this patent:

UNITED STATES PATENTS

| Number | Name | Date |
|---|---|---|
| 916,793 | Seward | Mar. 30, 1909 |
| 1,061,256 | Allen et al. | May 13, 1913 |
| 1,938,730 | Tschunkur et al. | Dec. 12, 1933 |

FOREIGN PATENTS

| Number | Country | Date |
|---|---|---|
| 112,875 | Australia | Apr. 7, 1941 |
| 580,540 | Germany | July 12, 1933 |

OTHER REFERENCES

Industrial and Eng. Chem., article by Fisher, pages 941–945, vol. 31, No. 8, August 1939.